Patented May 9, 1950

2,507,314

UNITED STATES PATENT OFFICE 2,507,314

METHOD OF TREATING ALUMINUM SURFACES

Ralph B. Mason, New Kensington, Pa., assignor to Aluminum Company of America, Pittsburgh, Pa., a corporation of Pennsylvania No Drawing. Application March 31, 1943,
Serial No. 481,320

14 Claims. (Cl. 101—149.2)

This invention relates to methods of producing on aluminum surfaces a uniform matte finish free of streaks and uneven color characteristics, preferably, but not necessarily, white in appearance and specifically useful where the surface is to be employed in the decorative, printing or reproducing arts or as a base for paint. The method of the invention includes, as two steps in eventual sequence, the formation of a film on the aluminum surface and the removal of this film and then a repetition of this treatment through at least one more complete cycle and, usually, through several such complete cycles. The film is formed on the aluminum surface by treating that surface with a solution of alkali metal fluoride. The film thus formed is removed from the surface with an acid solution, the surface is again treated in the fluoride solution, the film is again removed by acid and, if desirable, the cycle is again and again repeated. The surface thus obtained may be treated to develop thereon other films or coatings if such be desired. A particularly useful application of the invention is in the art of preparing aluminum surfaces for use in planographic printing. The commercial methods now prevalent for the preparation of aluminum printing plates involve mechanical graining of the aluminum surface by subjecting it to the action of abrasive materials. The lack of uniform results from such graining treatments has previously led to experimentation with chemical processes intended to obtain the desired effects. Such chemical treatments have, however, been deficient in certain particulars the most common of which has been lack of uniformity of the chemical action with the result that the treated surface is streaked. Another common fault of such surfaces is lack of the necessary water and ink adsorptive qualities.

When an aluminum surface is immersed in a solution of alkali metal fluoride, there results a relatively short period of chemical action, accompanied by gas evolution, which is finally terminated, for all practical purposes, by the formation on the aluminum of an impervious film which effectively prevents further reaction. The duration and depth of the attack on the aluminum surface is governed by the activity of the aluminum surface, the concentration of the fluoride in the attacking solution and the temperature of that solution. This is true whether the aluminum surface be of pure aluminum, a commercial grade thereof or an alloy consisting predominantly of aluminum, all of which are designated herein and in the appended claims by the term "aluminum surface." The duration of attack is, in any case, short, and when the preferred fluoride, cheap and readily available sodium fluoride, is used in concentration of 2 per cent by weight of the solution and the solution is heated near its boiling point, the period of reaction is very short before the formation of the substantially impervious film makes the aluminum surface immune from further atack.

If the aluminum surface is to be further treated by the fluoride solution, the film must be removed and, in accordance with this invention, this is accomplished by treating the surface with an acid solution to dissolve or loosen and remove the film. The surface thus becomes reactivated and is again responsive to the fluoride solution, and upon treatment therewith undergoes further attack with the consequent formation of another impervious film which shortly brings the attack to a stop. The acid reactivating treatment is again repeated and the film removed. At this point, with the completion of two cycles of treatment there develops, or begins to develop, upon the aluminum surface an evenly disposed matte finish which is usually white in appearance and is free of streaks and uneven color characteristics. The treatment cycle may be repeated three, four, five or more times often with increasingly better results although when the surface treated is to be used for printing care must be taken that the repetition of the cycle is concluded prior to the time that undue roughening of the surface appears.

Choice of an alkali metal fluoride, which term as employed herein and in the appended claims includes fluorides of ammonium, is often dictated by considerations of solubility, availability and cost. Usually, and for these reasons, the fluorides of sodium, potassium and ammonium are preferred for commercial use. Of these latter sodium fluoride appears to give the best results. The surface resulting from treatment with ammonium fluoride is not as white as that produced when sodium or potassium fluoride is used and often has a somewhat metallic luster. All, however, produce good results when used in accordance with the principles of this invention and the eventual purpose to which the treated surface is to be put will often be the controlling factor in the selection of a particular fluoride. Combinations of two or more alkali metal fluorides may be used in a single solution and such combined use is contemplated. In general, however, the use of a single fluoride has given best results.

The acid (the term includes acid salts) used to strip, i. e. de-film, the treated aluminum surface is largely a matter of selection. If the product is to have a very white surface, the use of acids which tend to color the surface should, of course, be avoided. Acid solutions which attack too severely and roughen the surface may usually be adjusted in concentration to avoid undue severity of attack. Acid solutions which attack too mildly may be increased in efficiency by adjustment of the temperature of treatment. The period and temperature of treatment will necessarily depend upon the nature and temperature of the acid solution. Such factors are purely operative in character and are readily controlled by the operator since the desired result, the removal of the film, is readily observed by the relatively sudden change in surface appearance. Mixtures of acids may often be desirable and I have found that the presence of chromic acid is particularly useful in insuring that a solution of sulphuric or phosphoric acid produces a white color. In the preparation of surfaces for printing where extreme whiteness is desirable, the following acid solutions have been used with good results:

(a) Nitric acid solution—50% $HNO_3$ by weight.

(b) Nitric acid and chromic acid solution—10% by weight of $HNO_3$ and 1% by weight of $CrO_3$.

(c) Sodium acid sulphate and chromic acid solution—20% by weight of $NaHSO_4$ and 3% by weight of $CrO_3$.

(d) Sulphuric acid and chromic acid solution—10% by volume of concentrated $H_2SO_4$ and 1 to 3% by weight of $CrO_3$.

In the practice of the invention it is desirable, although often not necessary, to first clean the aluminum surface by washing it free of all dirt and grease. For this purpose a solution which attacks or etches the surface slightly may be employed. Good results are obtainable when a warm solution containing about 5 per cent by weight sodium hydroxide is used as a cleaner. Another solution commonly employed at room temperature is that containing about 2½ per cent by weight hydrofluoric acid. Thereafter the surface is subjected to the treatment of the invention. The essence of this treatment is the repetition of the treating cycle, i. e. the repeated treatment of the aluminum surface to produce a film thereon and the subsequent removal or stripping of that film.

The amount of alkali metal fluoride present in the treating solution to achieve the results described may vary between about 1 and about 20 per cent by weight depending upon the particular fluoride, or mixture of fluorides, used. Sodium fluoride, the use of which is particularly preferred in the preparation of printing plates or surfaces for printing, is best employed in aqueous solutions in amounts of about 1 to 4 per cent by weight. Potassium fluoride gives best results when used in a solution containing about 5 to 20 per cent by weight thereof. Ammonium fluoride solutions operate most efficiently when the solution contains about 3 to 8 per cent of that compound. Satisfactory solutions include those containing about 1 per cent by weight of each of potassium fluoride and ammonium fluoride and those containing 2 per cent by weight of sodium fluoride and 1 per cent by weight of potassium fluoride. Usually operating temperatures, for best results, are in the range of about 150° to 180° F.; temperatures approximating room temperature are, however, best employed in the case of ammonium fluoride solutions.

The operating characteristics of various of the alkali metal fluoride solutions, more particularly the sodium fluoride or potassium fluoride solutions, may be improved by the addition thereto of about 1 to 10 per cent by weight of a non-fluoride alkali metal salt such as a sulphate, carbonate, oxalate or chloride. Such salts seem to stabilize the fluoride solution and to generally improve the results secured by the use thereof. Although the use of such salts is optional, I have found them very useful, particularly in amounts of about 2 to 4 per cent by weight, in obtaining a steadier and more uniform attack on the aluminum surface under treatment. When, for instance, sodium fluoride is being used, I prefer the use of a non-fluoride salt having a sodium radical. In the manufacture of printing plates, I have obtained best results by using alkali metal fluoride-alkali metal carbonate solutions or solutions of alkali metal fluoride and alkali metal sulphate. How often the treatment cycle must be repeated will depend upon the exact solution used and the composition and physical characteristics of the aluminum surface, but the desirable uniformity of matte finish is obtained only by repetition of the treatment cycle, and while results are sometimes obtained after two such cycles are completed, further repetition of the cycle is often desirable. Where the whitest obtainable surface is not desired, the process may be terminated prior to the last film removal step to leave on the aluminum surface the usually grey film formed by the reaction with the fluoride solution. Thus after the treatment cycle has been performed two or more times, a further fluoride treatment may be given the aluminum surface and the processing then terminated.

Whether the treatment of the aluminum surface with alkali metal fluoride solutions, or with the above described alkali metal fluoride-alkali metal salt solutions, produces on the aluminum surface a covering properly described as a film or more properly described as a coating is not definitely known to me. I therefore use the word "film" in a broad sense to include and describe whatever is formed on the aluminum surface by these solutions.

The aluminum surface finally produced, whether filmed or de-filmed, may be further treated for special purposes if desired. Any soluble silicate may be used for this purpose but the alkali metal silicates, and particularly sodium silicate, is preferred. The treatment with the silicate is simple and involves no expensive apparatus, the surface being immersed in or otherwise exposed to the silicate solution. A hot solution of silicate is preferably used and it is desirable that the surface be washed with water as soon as it is withdrawn from exposure to the silicate solution. The time of treatment and the concentration of the solution are variable but ordinarily treatments of over about 5 to 10 minuates in solutions containing at least 0.5 percent by weight of the silicate gives good results. The surface, if hardness is desired, may be hardened by applying thereto an anodically formed coating. When used as a paint base, the surface may, if desired, be treated in a chromic acid or chromate solution before the paint is applied. Other after-treatments will suggest themselves to those skilled in the art, depending upon the use to which the aluminum surface is to be put.

The matte surface produced by the practice of this invention is, because of its uniformity and its freedom from streaks or color defects, useful for many purposes. Its usual appearance is white, although some aluminum alloys have compositions which effectively prevent a high degree of whiteness, and this whiteness and uniformity of surface characteristics are particularly useful in the decorative, printing and reproducing arts.

What I claim is:

1. The method of forming a uniform matte surface on aluminum which comprises treating the aluminum surface in a solution containing alkali metal fluoride until substantial reaction ceases, subjecting the treated surface to the action of acid to reactivate the same, and thereafter repeating, at least once, the fluoride and acid treatments in the sequence stated.

2. The method of preparing an aluminum surface for use as a printing surface which comprises treating the aluminum surface with a solution containing sodium fluoride until substantial reaction ceases, subjecting the treated surface to the action of acid to reactivate the same and thereafter repeating the fluoride and acid treatments in the sequence stated.

3. The method of preparing an aluminum surface for use as a printing surface which comprises treating the aluminum surface with a solution containing sodium fluoride and a non-fluoride alkali metal salt until substantial reaction ceases, subjecting the treated surface to the action of acid to reactivate the same and thereafter repeating the fluoride and acid treatments in the sequence stated.

4. The method of preparing an aluminum surface for use as a printing surface which comprises treating the aluminum surface with a solution containing sodium fluoride and alkali metal carbonate until substantial reaction ceases, subjecting the treated surface to the action of acid to reactivate the same and thereafter repeating the fluoride and acid treatments in the sequence stated.

5. The method of preparing an aluminum surface for use as a printing surface which comprises treating the aluminum surface with a solution containing sodium fluoride and sodium carbonate until substantial reaction ceases, subjecting the treated surface to the action of acid to reactivate the same and thereafter repeating the fluoride and acid treatments in the sequence stated.

6. The method of preparing an aluminum surface for use as a printing surface which comprises treating the aluminum surface with a solution containing sodium fluoride and alkali metal sulphate until substantial reaction ceases, subjecting the treated surface to the action of acid to reactivate the same and thereafter repeating the fluoride and acid treatments in the sequence stated.

7. The method of preparing an aluminum surface for use as a printing surface which comprises treating the aluminum surface with a solution containing sodium fluoride and sodium carbonate until substantial reaction ceases, subjecting the treated surface to the action of acid to reactivate the same, at least once repeating the fluoride and acid treatments in the sequence stated and thereafter coating the thus treated surface with a solution of sodium silicate.

8. The method of forming a uniform matte surface on aluminum which comprises treating the aluminum surface in a solution containing alkali metal fluoride until substantial reaction ceases, subjecting the treated surface to the action of a mixture of acids including chromic acid to reactivate the same, and thereafter repeating, at least once, the fluoride and acid treatments in the sequence stated.

9. A printing plate having an aluminum surface prepared by at least twice subjecting the surface to a two-step treatment comprising exposing the surface to a solution containing alkali metal fluoride until reaction therewith substantially ceases and then subjecting the surface to the action of an acid to reactivate the same, said surface being characterized by a matte finish free of streaks and other non-uniform surface characteristics.

10. A printing plate having an aluminum surface prepared by at least twice subjecting the surface to a two-step treatment comprising exposing the surface to a solution containing alkali metal fluoride until reaction therewith substantially ceases and then subjecting the surface to the action of an acid to reactivate the same, said surface being provided with a silicate coating and being characterized by a matte finish free of streaks and other non-uniform surface characteristics.

11. The method of preparing an aluminum surface for use as a printing surface which comprises treating the aluminum surface with a solution containing potassium fluoride and a non-fluoride alkali metal salt until substantial reaction ceases, subjecting the treated surface to the action of acid to reactivate the same and thereafter repeating the fluoride and acid treatments in the sequence stated.

12. The method of forming a uniform matte surface on aluminum which comprises treating the aluminum surface in a solution containing alkali metal fluoride and non-fluoride alkali metal salt until substantial reaction ceases, subjecting the treated surface to the action of acid to reactivate the same, and thereafter repeating, at least once, the fluoride and acid treatments in the sequence stated.

13. The method of preparing an aluminum surface for use as a printed surface which comprises treating the aluminum surface with a solution containing alkali metal fluoride until substantial reaction ceases, subjecting the treated surface to the action of acid to reactivate the same, and thereafter repeating the fluoride and acid treatments in the sequence stated.

14. The method of preparing an aluminum surface for use as a printing surface which comprises treating the aluminum surface with a solution containing alkali metal fluoride and non-fluoride alkali metal salt until substantial reaction ceases, subjecting the treated surface to the action of acid to reactivate the same and thereafter repeating the fluoride and acid treatments in the sequence stated.

RALPH B. MASON.

REFERENCES CITED

The following references are of record in the file of this patent:

UNITED STATES PATENTS

| Number | Name | Date |
|---|---|---|
| 516,238 | Strecher | Mar. 13, 1894 |
| 795,216 | Forster | July 18, 1905 |
| 1,999,042 | Edwards et al. | Apr. 23, 1935 |
| 2,037,716 | Goedike | Apr. 21, 1936 |
| 2,147,778 | Rubinstein | Feb. 21, 1939 |
| 2,225,736 | Champion | Dec. 24, 1940 |
| 2,233,573 | Ayers | Mar. 4, 1941 |
| 2,285,468 | Slunder | June 9, 1942 |

FOREIGN PATENTS

| Number | Country | Date |
|---|---|---|
| 464,051 | Germany | Aug. 4, 1928 |

OTHER REFERENCES

The Metallurgy of Aluminum and Aluminum Alloys, R. J. Anderson, 1925, page 859. Copy in Div. 3 of the Patent Office.

The Technology of Aluminum and Its Alloys, by A. V. Zeerleder, pages 230 and 231, 1936. Copy in Division 3 of the Patent Office.

Inland Printer, Oct. 1939, vol. 104, No. 1, pages 64, 65, and 66.